United States Patent
Roumy et al.

(10) Patent No.: US 7,362,831 B2
(45) Date of Patent: Apr. 22, 2008

(54) METHOD AND DEVICE FOR SEQUENCING SIGNALS FROM MULTIUSERS

(75) Inventors: Aline Roumy, Nevers (FR); Didier Pirez, Saint Gratien (FR); Inbar Fijalkow, Cergy St Christophe (FR)

(73) Assignee: Thales, Paris (FR)

( * ) Notice: Subject to any disclaimer, the term of this patent is extended or adjusted under 35 U.S.C. 154(b) by 886 days.

(21) Appl. No.: 10/110,786

(22) PCT Filed: Aug. 31, 2001

(86) PCT No.: PCT/FR01/02718

§ 371 (c)(1),
(2), (4) Date: Apr. 29, 2002

(87) PCT Pub. No.: WO02/19558

PCT Pub. Date: Mar. 7, 2002

(65) Prior Publication Data

US 2002/0186707 A1    Dec. 12, 2002

(30) Foreign Application Priority Data

Sep. 1, 2000    (FR) .................................. 00 11200

(51) Int. Cl.
*H03D 1/06* (2006.01)

(52) U.S. Cl. ...................... 375/348; 375/233; 375/346; 370/320; 370/335; 370/342

(58) Field of Classification Search .................. 375/348, 375/148, 232, 260, 285, 342, 346, 130, 144, 375/147; 370/320, 335, 342, 464; 398/78
See application file for complete search history.

(56) References Cited

U.S. PATENT DOCUMENTS

| | | | |
|---|---|---|---|
| 5,414,699 A | 5/1995 | Lee | |
| 5,572,548 A | 11/1996 | Pirez et al. | |
| 5,761,237 A * | 6/1998 | Petersen et al. | 375/148 |
| 6,243,415 B1 | 6/2001 | Pipon et al. | |
| 6,496,543 B1 | 12/2002 | Zehavi | |
| 6,671,338 B1 | 12/2003 | Gamal et al. | |
| 2002/0110206 A1 | 8/2002 | Becker et al. | 375/346 |
| 2004/0001561 A1 | 1/2004 | Dent et al. | 375/308 |

OTHER PUBLICATIONS

Alexandra Duel-Hallen, Jack Holtzman and Zoran Zvonar, Multiuser Detection for CDMA Systems, Apr. 1995, IEEE Personal Communications Magazine, vol. 2, pp. 46-58.*
Pulin Patel and Jack Holtzman, Performance Comparison of a DS/CDMA System using a Successive Interference Cancellation (IC) Scheme and a Parallel IC Scheme under Fading, IEEE International Conference on Communications, May 1994, pp. 510-514.*

(Continued)

*Primary Examiner*—David C. Payne
*Assistant Examiner*—Adolf DSouza
(74) *Attorney, Agent, or Firm*—Oblon, Spivak, McClelland, Maier & Neustadt, P.C.

(57) ABSTRACT

Method for ordering a number K of given users in a digital signal equalizing and decoding device receiving the signals from the K users comprising at least the following steps:
  a step in which the K users, or at least the majority of K users, are ordered according to a defined criterion for a user k taking account of the power of user k corrected for intersymbol interference associated with this user k and with other users, and
  an equalizing and decoding step.

Use of the method in a CDMA context.

9 Claims, 3 Drawing Sheets

OTHER PUBLICATIONS

Edward Lee and David Messerschmitt, Digital Communication, 1988, Kluwer Academic Publishers, pp. 335-345.*

A. Duel-Hallen: "A family of multiuser decision-feedback detectors for asynchronous code-division multiple-access channels" IEEE Transactions on Communications, vol. 43, No. 2/04, part 1, pp. 421-434 Feb. 1, 1995.

A. Klein et al.: "Zero forcing and minimum mean-square-error equalization for multiuser detection in code-division multiple-access channels" IEEE Transactions on Vehicular Technology, vol. 45, No. 2, pp. 276-287 May 1, 1996.

U.S. Appl. No. 10/110,786, filed Apr. 29, 2002, Pending.

U.S. Appl. No. 10/204,425, filed Aug. 29, 2002, Pending.

Klein A et al.: "Zero forcing and minimum mean-square-error equalization for multiuser detection in code-division multiple-access channels" IEEE Transactions on Vehicular Technology, US IEEE Inc. New York, vol. 45, No. 2, May 1, 1996, pp. 276-287.

* cited by examiner

METHOD AND DEVICE FOR SEQUENCING SIGNALS FROM MULTIUSERS

BACKGROUND OF THE INVENTION

1. Field of the Invention

The field of the invention is that of the transmission and broadcasting of digital signals, in particular in the presence of transmission noise.

The invention relates to a method for ordering the users at a receiver comprising an equalizer and a decoder before carrying out the signal processing.

The invention applies in a CDMA (code division multiple access) context with channel coding.

It applies in particular to third generation mobile radio systems.

2. Description of Related Art

In digital transmission, a receiver can be viewed as a succession of several elementary functions each performing a specific process such as filtering, demodulating, equalizing, decoding, etc.

The CDMA technique is a multiple access technique which will form the basis of third-generation mobile radio systems.

The technique is based on the spread spectrum principle in which transmission takes place at a much higher bit rate than necessary for each user, by multiplying the useful symbols by sequences of high bit rate symbols, called "spreading sequences".

All the transmissions are then performed at the same frequency and at the same times, separation between the users being obtained by different spreading sequences.

The prior art describes receivers which make use of successive interference subtractions so as to order the users according to specific criteria.

For example, one method consists in classifying the users according only to the power associated with a user.

BRIEF SUMMARY OF THE INVENTION

The present invention provides a novel method making it possible in particular to order the K users according to a criterion which takes into account the power associated with a user but corrected for the contribution of intersymbol interference associated with this user and also with other users.

The invention also relates to a method and to a receiver where the users are treated one after another, a demodulation step being followed by an error decoding step.

The invention relates to a method for ordering a number K of given users in a digital signal equalizing and decoding device receiving the signals from the K users.

It is characterized in that it comprises at least the following steps:

a step in which the K users, or at least the majority of K users, are ordered according to a defined criterion for a user k taking account of the power of user k corrected for intersymbol interference associated with this user k and with other users, and an equalizing and decoding step.

The criterion for ordering the users is defined, for example, in the following manner:

$$C_k = \sum_{n=1}^{N} \left( h_{k,n}^\dagger h_{k,n} - \sum_{m \neq n} |h_{k,n}^\dagger h_{k,m}| - \sum_{j \neq k} \sum_m |h_{k,n}^\dagger h_{j,m}| \right)$$

where $h_{k,l}$ denotes the lth column of a matrix $H_k$ constructed from the vector containing the samples of the signal from user k, and n denotes the temporal index of the coded symbol.

The equalizing and decoding step may comprise at least the following steps:

a) at iteration 1, for the user of index 1, to transmit the signal to be demodulated to an equalizer of rank 1 then to a decoder of rank 1 so as to obtain information from the estimated modulated symbols from at least one of the decoders of rank (k−1), and b) for users k of index different to 1, to transmit the signal to be demodulated to an equalizer of rank k and the various estimated modulated symbols from at least one of the decoders of rank (k−1).

The invention also relates to a device for putting the signals received from several users into a given order before the signals are processed in a signal decoding device. It is characterized in that it comprises at least a device suitable for determining a criterion for ordering the signals from users, the criterion taking into account the power of a given user k and of intersymbol interference for user k himself and for the other users.

The device may comprise K modules, each module having at least one equalizer linked to a decoder, and an equalizer of index k linked to several decoders of lower index 1 to k−1.

An equalizer of a module comprises, for example, at least a first block which receives at least the signal to be demodulated, from user k, and the estimates of the symbols associated with users 1 to k−1 and a second block designed to subtract the contribution from the past symbols already demodulated.

The method and device according to the invention are applied for example to demodulate a signal in the context of a space division and/or a CDMA-type code division multiple access scheme.

BRIEF DESCRIPTION OF THE SEVERAL VIEWS OF THE DRAWINGS

Other advantages and features of the invention will become more apparent on reading the description provided for illustration purposes and not at all limiting, in conjunction with the figures in which.

DETAILED DESCRIPTION OF THE INVENTION

Figure 1:
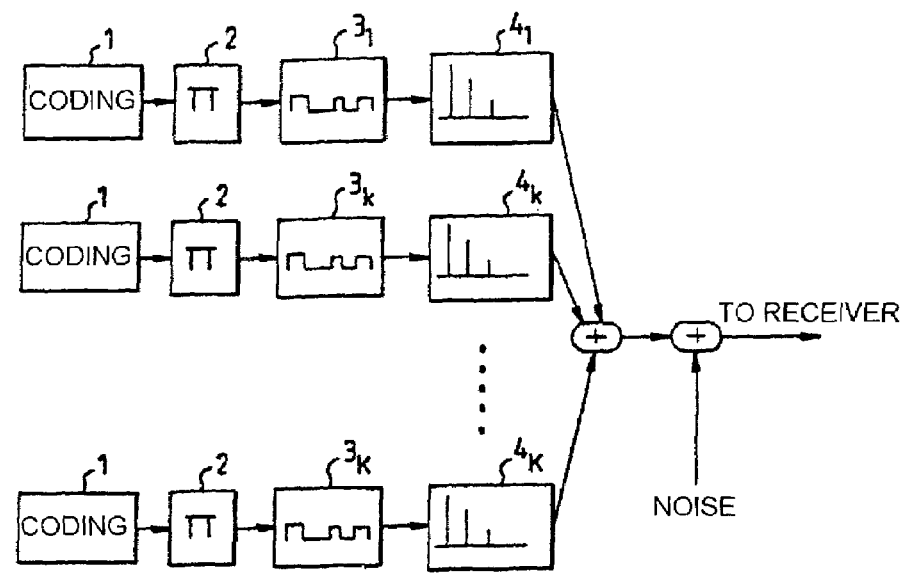
FIG. 1 represents a coding chain.

FIG. 1 shows a system for coding the signals transmitted by K users who share the same propagation channel and who use waveforms spread spectrally via codes, each user denoted by k, where k varies from 1 to K, having his own code. The users are considered as asynchronous users who access the same frequency-selective propagation channel in order to transmit information.

The digital signal associated with user k is coded using a correcting code 1 before being transmitted to an interleaver 2. These two functional blocks may be identical or very different for each user k. The correcting code is for example a convolutional-type code, but not necessarily so.

The coded signal is then "spread" using a spreading sequence $3_k$—the purpose of the index k is to denote the specific spreading sequence for each user k. The different spreading sequences for each user thus provide for discrimination between them. A modulated signal will see a different propagation channel $4_k$ for each user. This typically corresponds for example to the uplink of a cellular mobile radio system. The concept of propagation channel includes for example any time shifts resulting from an absence of synchronization between the K users.

The receiver sees the sum of the various contributions of the signals from the various propagation channels. Thermal noise associated with the input stages of the receiver described below or even interference from signals transmitted in the same frequency band, for example mobile terminals of neighboring cells using the same frequency, may be added to these signals.

To simplify the description, the modulation operations, typically the shaping by a half-Nyquist filter and the transmission via carrier, which are known to a person skilled in the art, are not represented in FIG. 1.

Figure 2:
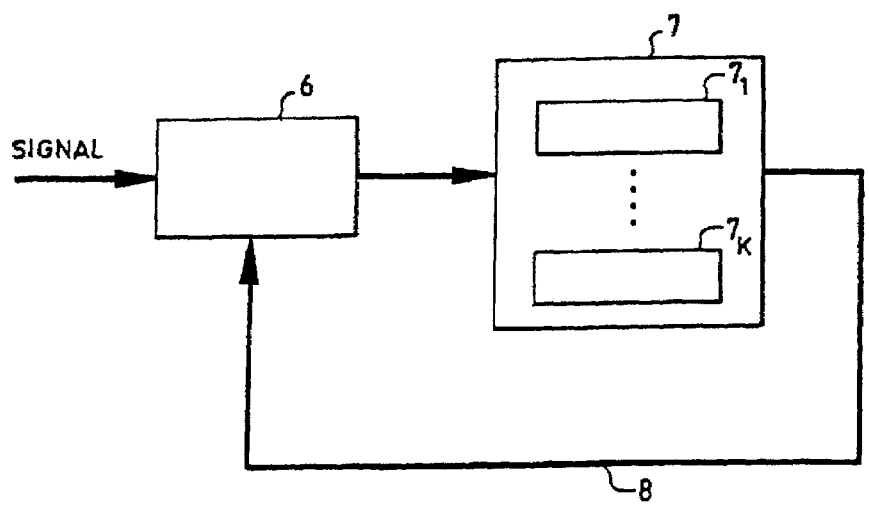
FIG. 2 is a general scheme of a signal processing receiver.

FIG. 2 shows a very general block diagram of a receiver.

The signal made of all the symbols of all K users arrives in a multiuser equalizer 6 before being transmitted to a decoding device 7 comprising one or more decoders $7_k$.

The equalizer 6 receives the signal from the various users along with information provided by the decoding block 7 on the coded symbols via a link 8, except when no decoding has been performed. The equalizer 6 delivers as output weighted information on the coded symbols which make use of these two types of information, typically the probabilities of transmission of the various possible symbols.

The functions for deinterleaving and shaping the weighted information between the equalizer and the decoders are not represented in the figure. These functions are for example for translating information on the 8-ary symbols into probabilities on the bits when the modulation is in 8 states and the code is binary.

The decoder or decoders $7_k$ receive information from the equalizer and make use of the information associated with the error-correcting code so as to provide more reliable information on the useful symbols and therefore the coded symbols. For example for a convolutional code, the decoder can be of the "MAP" (maximum a posteriori) type and calculates the probabilities on the useful symbols from the knowledge of the probabilities on the coded symbols.

The weighted information is then reinterleaved and reshaped before being reinputted into the "equalizer" block. The data interleaving step is carried out according to a method known to a person skilled in the art and will not be detailed in this description. One way of proceeding consists for example in writing the data column by column in a matrix of appropriate dimension and reading this matrix row by row for example. This advantageously results in any errors being distributed during the reading stage of the signal. The shaping is performed according to conventional methods which are known to a person skilled in the art, and hence are not detailed.

The signal received by the equalizer can be modeled as described below.

It is assumed that a block of received samples can be arranged in a vectorial form Z. This block of samples arises from the contribution of the K users, each of them contributing with N coded symbols.

The contribution from an arbitrary user of index k to the received signal is obtained, without taking into account the modulation operations on the carrier, via the following operations:

spreading by a factor Q of each coded symbol,
shaping, for example by a half-Nyquist filter,
filtering by the propagation channel by introducing multiple paths for example,
anti-aliasing filtering at the receive end, and
sampling.

The signal from user k before sampling is given for example by equation (1) below $$z_k(t) = \sum_n a_{n,k} \sum_{q=1}^{Q} c_{q,k} \cdot (h \otimes p_k \otimes f)(t - qT_c - nT_s) \quad (1)$$

In this equation, h represents the shaping filter at the transmission stage, $p_k(t)$ is the propagation channel specific to a user k, f(t) is the receive filter before sampling, $T_c$ is the chip period, inverse of the modulation rate, and $T_s$ is the symbol period before spreading. The symbols $a_{n,k}$ are the coded symbols of the user k and the symbols $c_{q,k}$ are the chips of the spreading sequence, where n corresponds to the temporal index of the coded symbol and q corresponds to the index of the chips or symbols of the spreading sequence.

The symbol represents the convolution.

Suppose:

$$s_k(t) = \sum_{q=1}^{Q} c_{q,k} \cdot (h \otimes p_k \otimes f)(t - qT_c) \quad (2)$$

Then:

$$z_k(t) = \sum_n a_{n,k} s_k(t - nT_s) \quad (3)$$

Equation (3) shows that the contribution of each user k can be put in the form of filtering of a train of symbols by a certain function $s_k(t)$ which contains the effects of the spreading, of the shaping filter at the transmission stage, of the propagation and of the receive filters before sampling.

Figure 4:
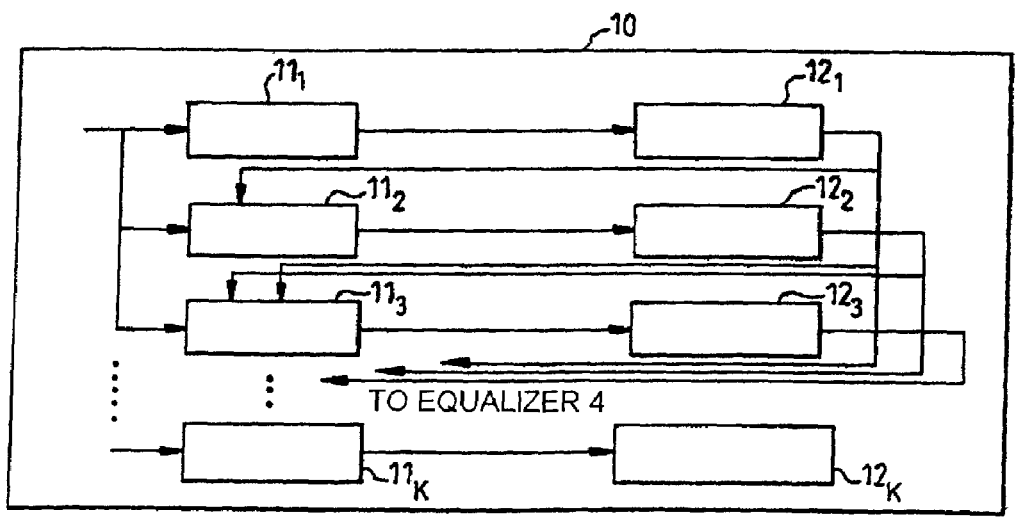
FIG. 4 shows a specific structure of a receiver according to the invention.

Let $S_k$ be the vector containing the samples of $s_k(t)$. Then the sampled signal can be rewritten for the user k as follows:

$$Z_k = H_k \cdot A_k \quad (4)$$

where $A_k$ is the vector of N symbols $a_{n,k}$ and $H_k$ is a matrix constructed from the vector Sk in the manner described in FIG. 4.

The columns of the matrix $H_k$ are constructed from shifted versions of the sequence $S_k$, and each column corresponds to a new symbol of the vector $A_k$ and the shift corresponds to the number of samples per symbol. The recovery between the various shifted versions of $S_k$ corresponds to the duration of the overall impulse response (filters plus propagation channel).

The complete model can then be represented as follows:

$$Z = \sum_{k=1}^{K} H_k A_k + W \qquad (5)$$

In this equation (5), W is a noise vector associated with the interference outside the cell and with the noise inside the receiver.

Criterion for Ordering the Users Before Signal Processing

The different equalization and decoding steps can advantageously be applied to a set of users who are ordered according to a criterion taking account of the power associated with a user, from which the contribution of intersymbol interference for this same user and for the other users is subtracted.

Figure 3:
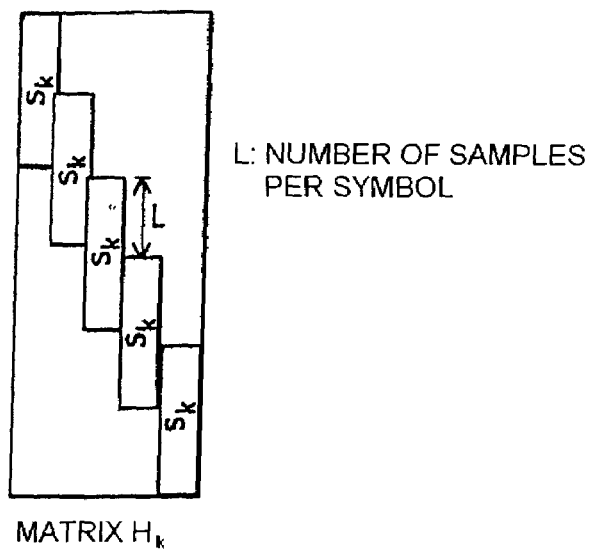
FIG. 3 is a matrix allowing the received signal to be modeled.

This criterion is determined for example as follows:

$h_{k,l}$ denotes the lth column of the matrix $H_k$ described in relation to FIG. 3. This vector denotes the overall impulse response of the channel for the lth symbol of the block to be demodulated, of user k, the criterion $C_k$ is determined as follows $$C_k = \sum_{n=1}^{N} \left( h_{k,n}^\dagger h_{k,n} - \sum_{m \neq n} |h_{k,n}^\dagger h_{k,m}| - \sum_{j \neq k} \sum_{m} |h_{k,n}^\dagger h_{j,m}| \right)$$

where the symbol † denotes the transposed conjugate, the first term corresponds to the power associated with user k, the second term corresponds to the contribution from the user and the third term to the contribution to intersymbol interference for all the other users.

This calculation involves correlations between the signals corresponding to the various symbols whether they are transmitted by the user k himself or by the others.

In fact, the method measures the existing distance, at least, between two opposed symbols at the output of a filter designed according to the impulse response $h_{k,n}$, whatever the values of the other symbols which interfere.

The users are arranged in a decreasing order before performing the steps of the method according to the invention.

FIG. 4 shows a structure of a receiver 10 according to the invention comprising several equalizers $11_k$ and several decoders $12_k$, where the index k is used to identify a user. The receiver therefore comprises as many module as there are users, each module being formed from an equalizer and a decoder.

The signal comprising the symbols from all the users is received by each equalizer $11_k$ of the receiver 10.

Step a)

The equalizer of rank 1 referenced $11_1$ receives for example the samples from the signal to be decoded, without information a priori on its own symbols or on the symbols of the other users. The information resulting from this first equalization is transmitted to the decoder of rank 1 denoted by $12_1$ which provides more reliable information on the useful symbols and therefore the modulated symbols of the user.

Step b)

The reliable information, on the useful symbols, obtained for user 1 is then transmitted to the equalizer of rank 2, $11_2$, which also receives the samples of the received signal to be decoded. The equalizer thus enables the interference associated with the user of rank 1 to be taken into account, while still knowing nothing a priori about the symbols of the users of rank greater than or equal to 2. The information from this second equalization is then transmitted to the decoder of rank 2, $12_2$, which will provide information on the useful symbols of the user of rank 2.

Step b) is executed as many times as there are users of rank different to 1, that is K−1 times.

To generalize, for the user of index k, the samples of the signal are transmitted to the equalizer of rank k, $11_k$, which also receives the useful symbols on the users of rank 1 to k−1, resulting from the different decoders $12_1, \ldots, 12_{k-1}$. The equalizer thus allows account to be taken of the interference associated with the users of rank 1 to (k−1) for decoding the signal associated with user k. The information from this kth equalization is then transmitted to the decoder of rank k, $12_k$, which will provide information on the useful symbols of the user of rank k.

The last equalizer has information on all the other users.

According to an embodiment of the invention, the equalizer used has a two-part structure. The first part is for subtracting for a user k in question the participation of the users of rank 1 to k−1, and the second part corresponds to a decision feedback equalizer (DFE) structure having the characteristics described below.

Figure 5:
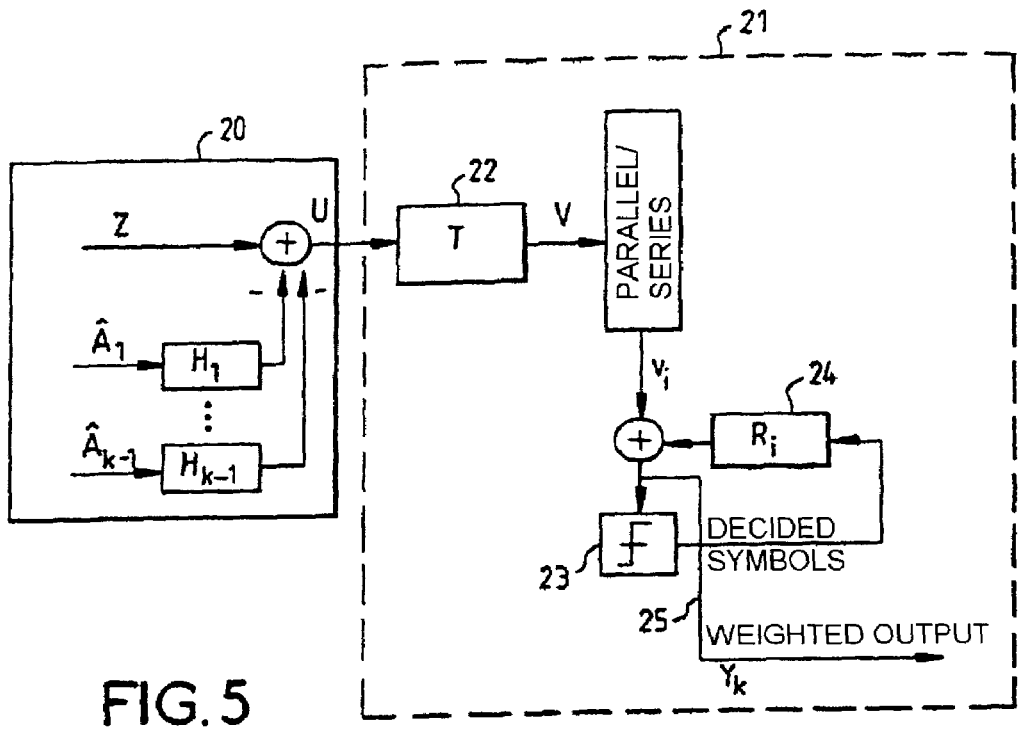
FIG. 5 shows an example structure of the equalizer used in the method according to the invention.

FIG. 5 shows the structure of an equalizer operating by using the feedback principle described previously in relation to FIG. 4.

During equalization of user k, the purpose of the first block 20 is to subtract from the received signal Z the contributions of the users of indices between 1 and k−1, that is users already processed. To do this, it receives the vectors of estimated symbols corresponding to these users. The estimate of the symbols is made for example by calculating the mathematical expectation of the value of the symbol from the probabilities obtained during the decoding steps.

The purpose of the second block 21 is to process the intersymbol interference corresponding to the symbols of user k himself, and the noise resulting from the users of indices k+1 to K not yet processed and from the thermal noise. The equalizer has a DFE structure, that is it is made up of a "transverse filter" part and a "decision in feedback" part. The "transverse filter" part is calculated by taking into account the knowledge of the structure of the noise generated by the users not yet processed and by the thermal noise. The "decision in feedback" part has a sequential operation. For each index n symbol of the current user, it subtracts the contribution from the already decided lower index symbols.

The second block according to the invention comprises for example a transverse filter 22 such as a matrix being applied to the vector U, and the resulting vector V is sampled at the symbol rate. The coordinates $v_1$ of this vector are then passed into a loop comprising a decision unit 23 and a recursive filter 24. The decision unit is for obtaining a decision on the symbols. At each new symbol, the recursive filter 24 subtracts the contribution from the symbols already decided in the block and forwarded. The loop also comprises a weighted output 25, before the decision unit, for transmitting the symbols to the decoder.

The calculation from the transverse filter 22 and the recursive filter 24 is carried out for example in the manner described below.

The calculation of the filters uses as criterion the minimization of the mean square error between the weighted output of the equalizer and the vector of symbols of user k.

$$\min(E(\|Y_k - A_k\|^2)) \quad (6)$$

From equation (5), the vector U can be represented as follows $$U = H_k A_k + B \quad (7)$$

$$B = \sum_{l=k+1}^{K} H_l A_l + W$$

In this equation (7), the noise is made up of signals transmitted by the rank k+1 to K users not yet decoded and of the initial additive noise W.

For a white noise W, the expressions for the filters are given below:

The correlation matrix for B is $$R_B = \sigma_A^2 \cdot \sum_{l=k+1}^{K} H_l H_l^\dagger + \sigma_W^2 \cdot Id \quad (8)$$

where $\sigma_A^2$ is the power of the modulation symbols, $\sigma_w^2$ is the power of the noise and Id is the identity matrix the matrix Q is defined by $$Q = H_k^\dagger R_B^{-1} H_k + \frac{1}{\sigma_W^2} Id \quad (9)$$

the Cholesky composition of this matrix is formed as follows $$Q = (\Sigma L)^\dagger (\Sigma L) \quad (10)$$

In equation (10), $\Sigma$ is a diagonal matrix and L is a lower triangular matrix.

The expression of the transverse filter which minimizes criterion (6) is $$T = \Sigma^{-2} L^{-1\dagger} H_k^\dagger R_B^{-1} \quad (11)$$

The recursive filter is determined by the rows of (L-Id).

According to an embodiment of the invention, the device uses an interference canceler when all the symbols to be demodulated have been the subject of at least one decoding stage. In this situation, unlike the decision feedback equalizer, when it is desired to decide the symbol j of the user k, all the other symbols of the same user or of the other users can be considered known, even if in practice only the estimates of these symbols are known. It is then possible to subtract their contribution totally.

Figure 6:
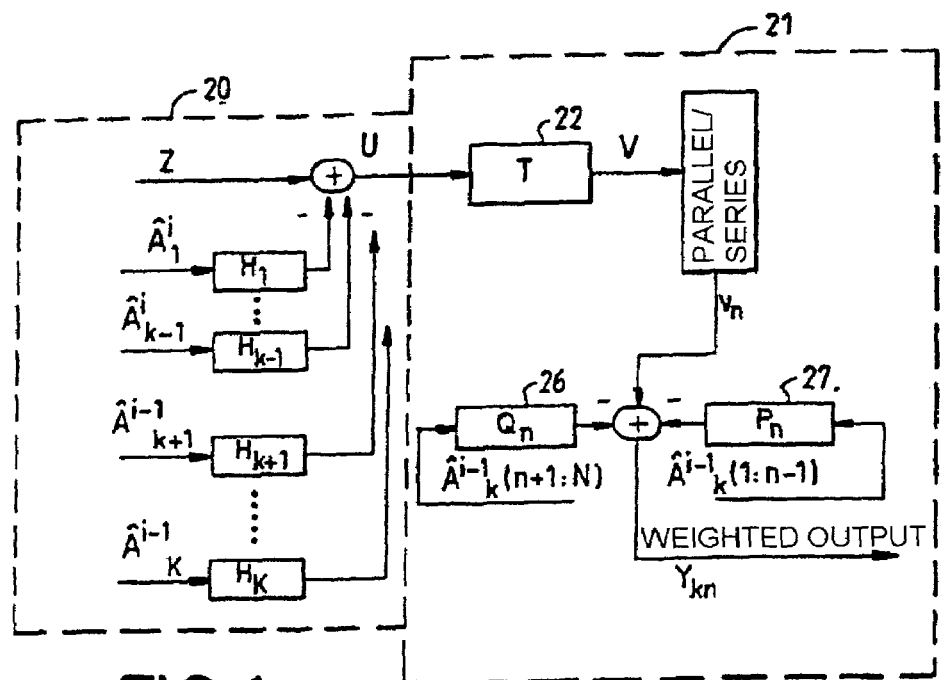
FIG. 6 is an alternative implementation of the invention.

FIG. 6 shows the principle of this canceler in block diagram form.

Compared to the decision feedback equalizer case in FIG. 5, there is more information on all the symbols from iteration i−1 for certain users, for example those of index 1 to k−1, and from the current iteration i for the other users of index k+1 to K.

The principle implemented consists in:
subtracting the contributions from all the users other than user k being processed, by using the most recent information for each of them, for the users of index 1 to k−1 the estimates of the vectors of the symbols during iteration i and for the users of index k+1 to K the information of the estimates obtained during iteration (i−1), this iteration being carried out in the first block 20 which generates a vector U, filtering the received samples for the user k in the filter T 22, and the resulting vector V is then sampled for example at the symbol rate, subtracting in the second block 21, for a given symbol n, the residual intersymbol interference coming from the other symbols of the user k. The contribution from the symbols 1 to n−1 is determined by the filter $P_n$, 26 and the contribution from the index n+1 to N symbols is determined by a filter $Q_n$, 27.

In this way, compared with the decision feedback, much richer information is available than the previous decided symbols, that is information on the past but also future symbols from the previous iteration.

After the processing steps, the next step is the decoding step, and then the next user is considered and the contribution of user k is subtracted by using the results obtained during iteration i and no longer i−1.

What is claimed is:

1. A method for ordering a number K of users in a digital signal equalizing and decoding device receiving signals from the K users, comprising:
    ordering, for a user k, at least a majority of the K users according to a defined criterion, said defined criterion comprising the power of user k, from which intersymbol interference from said user k and from other users is subtracted out,
    equalizing the ordered number K of users; and
    decoding the signals of the number K of users, wherein the defined criterion involves correlations between symbols transmitted by the user k and symbols transmitted by the other users.

2. The method as claimed in claim 1, wherein the defined criterion for ordering the users is determined as follows:

$$C_k = \sum_{n=1}^{N} \left( h_{k,n}^\dagger h_{k,n} - \sum_{m \neq n} |h_{k,n}^\dagger h_{k,m}| - \sum_{j \neq k} \sum_{m} |h_{k,n}^\dagger h_{j,m}| \right)$$

where $h_{kl}$ denotes a lth column of a matrix $H_k$ constructed from a vector including samples of a signal of user k, and n denotes a temporal index of a coded symbol.

3. The method as claimed in claim 1, wherein the equalizing and decoding comprises:
    (a) at iteration 1, for a user of index 1 to transmit a signal to be demodulated to an equalizer of rank 1, and then to a decoder of rank 1, to obtain information from estimated modulated symbols from at least one of decoders of rank (k−1); and
    (b) for users k of an index different from 1, to transmit the signal to be demodulated to an equalizer of rank k and various estimated modulated symbols from at least one of the decoders of rank (k−1).

4. The method as claimed in claim 3, further comprising plural iterations and wherein, for an iteration different from the first iteration, step
    b) comprises, during an ith iteration, transmitting to a first block of the equalizer of rank k the symbols of user k to be demodulated, estimates of the symbols of users 1 to k−1 obtained during the ith iteration and estimates of the symbols of users k+1 to K obtained during an (i−1)th iteration and the estimates of the symbols of user k from the (i−1)th iteration.

5. The use of the method as claimed in claim 1 to demodulate a signal in a context of at least one of a space division and a CDMA-type code division multiple access scheme.

6. A device for putting signals received from plural users into a given order before the signals are processed in a signal decoding device, comprising:
  a device configured to determine a criterion for ordering the signals from the plural users, the criterion comprising a power of a given user k, from which intersymbol interference from user k and from the other users is subtracted out; and
  K modules, each module having at least one equalizer linked to a decoder, and wherein an equalizer of index k is linked to plural decoders of lower index 1 to k−1.

7. The device as claimed in claim 6, wherein the equalizer comprises at least first and second blocks, the first block receives at least the signal to be demodulated, from user k, and estimates of symbols associated with users 1 to k−1, and the second block is configured to subtract a contribution from past symbols already demodulated.

8. The device as claimed in claim 7, wherein the first block receives, at an ith iteration, at least the signal from user k to be demodulated, at least estimates of symbols associated with users 1 to k−1 corresponding to the ith iteration and estimates of symbols of users k+1 to K obtained at an (i−1)th iteration, and the second block receives the estimates of the symbols of user k obtained at the (i−1)th iteration.

9. The use of the device as claimed in claim 6 to demodulate a signal in a context of at least one of a space division and a CDMA-type code division multiple access scheme.

* * * * *